(12) United States Patent
Yamasaki (10) Patent No.: US 9,199,723 B2
(45) Date of Patent: Dec. 1, 2015

(54) AIRCRAFT CONTROL SYSTEM, AIRCRAFT, AIRCRAFT CONTROL PROGRAM, AND METHOD FOR CONTROLLING AIRCRAFT

(75) Inventor: Koichi Yamasaki, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 108 days.

(21) Appl. No.: 14/001,765

(22) PCT Filed: Mar. 8, 2012

(86) PCT No.: PCT/JP2012/055943
§ 371 (c)(1),
(2), (4) Date: Aug. 27, 2013

(87) PCT Pub. No.: WO2012/124594
PCT Pub. Date: Sep. 20, 2012

(65) Prior Publication Data
US 2013/0338859 A1 Dec. 19, 2013

(30) Foreign Application Priority Data
Mar. 14, 2011 (JP) ................................. 2011-055320

(51) Int. Cl.
G01C 23/00 (2006.01)
B64C 13/16 (2006.01)
G05D 1/00 (2006.01)

(52) U.S. Cl.
CPC .............. B64C 13/16 (2013.01); G05D 1/0055 (2013.01)

(58) Field of Classification Search
None
See application file for complete search history.

(56) References Cited

U.S. PATENT DOCUMENTS

| 3,829,838 A * | 8/1974 | Lewis et al. ................... 345/419 |
| 5,330,131 A | 7/1994 | Burcham et al. |
| 6,102,330 A | 8/2000 | Burken et al. |
| 2010/0025544 A1 | 2/2010 | Beaufrere |

(Continued)

FOREIGN PATENT DOCUMENTS

| JP | 6-336199 | 12/1994 |
| JP | 8-136199 | 5/1996 |

(Continued)

OTHER PUBLICATIONS

International Search Report issued Jun. 12, 2012 in International Application No. PCT/JP2012/055943.

(Continued)

Primary Examiner — Thomas Tarcza
Assistant Examiner — Adam Alharbi
(74) Attorney, Agent, or Firm — Wenderoth, Lind & Ponack, L.L.P.

(57) ABSTRACT

A control system of an aircraft includes a computer that controls flight based on either a flight control law that controls flight by controlling the deflection angles of control surfaces or a control surface/thrust integrated flight control law that controls flight by controlling the deflection angles of the control surfaces and engine thrust, and a control surface failure/damage detection device. If malfunctioning of the control surface(s) is detected, the deflection angles and the rates of change of the deflection angles of the control surfaces are calculated based on the detection result, and the necessity of switching from the flight control law to the control surface/thrust integrated flight control law is judged by judging whether or not the calculated deflection angles or rates of change of the deflection angles exceed an acceptable range of change.

8 Claims, 3 Drawing Sheets

(56) References Cited

U.S. PATENT DOCUMENTS

| | | | |
|---|---|---|---|
| 2012/0298806 A1* | 11/2012 | Yamasaki | 244/195 |
| 2012/0313850 A1* | 12/2012 | Ishida et al. | 345/156 |
| 2012/0313909 A1* | 12/2012 | Ishida et al. | 345/207 |

FOREIGN PATENT DOCUMENTS

| | | |
|---|---|---|
| JP | 10-167194 | 6/1998 |
| JP | 2003-175896 | 6/2003 |
| JP | 2003-291893 | 10/2003 |
| JP | 3643870 | 4/2005 |
| RU | 22564 | 4/2002 |

OTHER PUBLICATIONS

Joseph R. Boland, et al., "Aircraft Control Requirements and Achievable Dynamics Prediction", AIAA (American Institute of Aeronautics and Astronautics)—93-3648-CP, pp. 304-315, Aug. 1993.

Extended European Search Report issued Dec. 17, 2014 in European patent application No. 12757207.1.

Decision to Grant a Patent issued Aug. 18, 2015 in corresponding Japanese patent application No. 2011-055320.

Notice of Allowance issued Mar. 31, 2015 in corresponding Russian patent application No. 2013139093 (with English translation).

* cited by examiner

AIRCRAFT CONTROL SYSTEM, AIRCRAFT, AIRCRAFT CONTROL PROGRAM, AND METHOD FOR CONTROLLING AIRCRAFT

TECHNICAL FIELD

The present invention relates to an aircraft control system, an aircraft, an aircraft control program, and a method for controlling an aircraft.

BACKGROUND ART

Generally, the attitude of aircraft is controlled by an actuator appropriately moving control surfaces such as elevators, ailerons, and rudders in accordance with a predetermined control signal. More specifically, in aircraft control systems, an onboard controlling computer calculates a deflection angle command control signal for controlling control surfaces based on information detected from various sensors such as an inertial sensor and an air data sensor provided on the aircraft and an operation command signal from a control column such as a yoke, the actuator then moves the control surfaces in accordance with the deflection angle command control signal, and thus, the aircraft is maintained at a desired attitude, and stable flight is achieved.

Patent Literature 1 discloses a reconfigurable flight control system in which a control unit and a distribution unit are separately provided, the control unit controlling rotational motion of an airframe, and the distribution unit calculating a control drive signal from an angular acceleration signal output from the control unit and distributing the control drive signal to controlling control surface signals for control surfaces to be controlled, and furthermore, a nonlinear compensation unit is provided that corrects input and output values of the control unit in accordance with kinetic conditions of the aircraft, and if there is a failure of or damage to a control surface or the like, reconfiguration can be achieved by not using the controlling control surface or decreasing the extent to which the control surface is used.

CITATION LIST

Patent Literature

{PTL 1}
Publication of Japanese Patent No. 3643870

SUMMARY OF INVENTION

Technical Problem

As disclosed in Patent Literature 1, a reconfigurable flight control system, when receiving the result of a failure of or damage to any control surface, reconfigures the flight control law that controls flight by controlling deflection angles of the control surfaces, and thus realizes continuation of flight, safe landing, and the like.

On the other hand, if it is impossible to continue flight, make a safe landing, and so on by merely reconfiguring the flight control law, the control system switches to a control surface/thrust integrated flight control law that controls flight by controlling the deflection angles of the control surfaces and engine thrust, and thus realizes continuation of flight, safe landing, and the like.

However, under the control surface/thrust integrated flight control law, the motion response of the aircraft becomes slower because the engine thrust also is used to control flight. Therefore, it is desirable to use the reconfigurable flight control law as long as possible to continue controlling the aircraft, and switching from the reconfigurable flight control law to the control surface/thrust integrated flight control law should be appropriately performed.

The present invention has been made in view of circumstances as described above, and it is an object thereof to provide an aircraft control system, an aircraft, an aircraft control program, and a method for controlling an aircraft that can appropriately perform switching from a control law that controls flight by controlling the deflection angles of control surfaces to a control law that controls flight by controlling the deflection angles of the control surfaces and engine thrust.

Solution to Problem

To solve the problems, an aircraft control system, an aircraft, an aircraft control program, and a method for controlling an aircraft according to the present invention employ the following solutions.

That is to say, an aircraft control system according to the present invention includes a control unit that controls flight based on either a first control law or a second control law, the first control law controlling flight by controlling deflection angles of control surfaces and the second controlling law controlling flight by controlling the deflection angles of the control surfaces and engine thrust, a control surface failure/damage detection unit that detects that at least one of the control surfaces is malfunctioning, a calculation unit that calculates the deflection angles and rates of change of the deflection angles that are necessary for realization of desired flight characteristics based on a detection result of the control surface failure/damage detection unit if malfunctioning of the control surface(s) is detected by the control surface failure/damage detection unit, and a judgment unit that judges whether or not switching from the first control law to the second control law is necessary by judging whether or not the deflection angles or the rates of change of the deflection angles that are calculated by the calculation unit exceed an acceptable range of change.

According to the present invention, the flight of an aircraft is controlled based on either the first control law, which controls flight by controlling the deflection angles of the control surfaces, or the second control law, which controls flight by controlling the deflection angles of the control surfaces and the engine thrust.

If malfunctioning of any control surface is not detected by the control surface failure/damage detection unit, the aircraft is controlled based on the first control law.

Moreover, since the second control law uses also the engine thrust to control flight, the motion response of the aircraft under the second control law is slower than that under the first control law.

If the control surface failure/damage detection unit detects that a control surface is malfunctioning, the calculation unit calculates the deflection angles and the rates of change of the deflection angles that are necessary for realization of desired flight characteristics based on the detection result of the control surface failure/damage detection unit.

Then, the judgment unit judges whether or not the deflection angles or the rates of change of the deflection angles that are calculated by the calculation unit exceed an acceptable range of change, thereby judging whether or not switching from the first control law to the second control law is necessary.

In this manner, according to the present invention, the necessity of switching from the first control law to the second control law is judged from the deflection angles and the rates of change of the deflection angles of the control surfaces, and thus switching of the control laws can be appropriately performed.

Moreover, in an aircraft control system according to a first aspect of the present invention, if malfunctioning of the control surface(s) is detected by the control surface failure/damage detection unit, if the deflection angles or the rates of change of the deflection angles that are calculated by the calculation unit do not exceed the acceptable range of change, the control unit reconfigures the first control law so as not to use the control surface(s) whose malfunctioning is detected by the control surface failure/damage detection unit, or so as to decrease the extent to which the control surface(s) is used, and if the deflection angles or the rates of change of the deflection angles that are calculated by the calculation unit exceed the acceptable range of change, the control unit switches from the first control law to the second control law.

According to the first aspect of the present invention, if the deflection angles or the rates of change of the deflection angles that are calculated by the calculation unit do not exceed the acceptable range of change, the first control law is reconfigured so as not to use the control surface(s) whose malfunctioning is detected, or so as to decrease the extent to which this(these) control surface(s) is used, and thus switching from the first control law to the second control law can be suppressed. On the other hand, if the deflection angles or the rates of change of the deflection angles that are calculated by the calculation unit exceed the acceptable range of change, the control law for the airframe is switched from the first control law to the second control law, and thus switching of the control laws is performed only if necessary.

Moreover, in an aircraft control system according to a second aspect of the present invention, the calculation unit calculates required amounts of change in moment of an aircraft from angular velocity and angular acceleration about a body axis of the aircraft that are calculated based on a response model indicating motion characteristics of the aircraft, and calculates the deflection angles and the rates of change of the deflection angles that satisfy the calculated required amounts of change in moment.

According to the second aspect of the present invention, since the required amounts of change in moment of the aircraft are calculated from the angular velocity and the angular acceleration about a body axis of the aircraft that are calculated based on the response model indicating motion characteristics of the aircraft, and the deflection angles and the rates of change of the deflection angles that satisfy the calculated required amounts of change in moment are calculated, the deflection angles and the rates of change of the deflection angles that are necessary for realization of various modes such as a roll mode, a Dutch roll mode, and a longitudinal short-period mode of the aircraft can be easily calculated.

Moreover, the aircraft control system according to the second aspect of the present invention may also be configured so that the calculation unit calculates the required amounts of change in moment of the aircraft taking an effect of a gyroscopic moment of an engine into account.

With this configuration, the required amounts of change in moment of the aircraft are calculated with the effect of the gyroscopic moment of the engine taken into account, and thus the deflection angles and the rates of change of the deflection angles that are necessary for realization of a mode of the aircraft can be more accurately calculated.

An aircraft according to the present invention includes the above-described aircraft control system.

According to the present invention, since the aircraft includes the above-described control system, switching from the control law that controls flight by controlling the deflection angles of the control surfaces to the control law that controls flight by controlling the deflection angles of the control surfaces and the engine thrust can be appropriately performed.

Furthermore, an aircraft control program according to the present invention is a program for controlling an aircraft including a control unit that controls flight based on either a first control law or a second control law, the first control law controlling flight by controlling deflection angles of control surfaces and the second control law controlling flight by controlling the deflection angles of the control surfaces and engine thrust, and a control surface failure/damage detection unit that detects that at least one of the control surfaces is malfunctioning, the program causing a computer to function as a calculation unit that calculates the deflection angles and rates of change of the deflection angles that are necessary for realization of desired flight characteristics based on a detection result of the control surface failure/damage detection unit if malfunctioning of the control surface(s) is detected by the control surface failure/damage detection unit, and a judgment that judges whether or not switching from the first control law to the second control law is necessary by judging whether or not the deflection angles or the rates of change of the deflection angles that are calculated by the calculation unit exceed an acceptable range of change.

According to the present invention, since the necessity of switching from the first control law to the second control law is judged from the deflection angles and the rates of change of the deflection angles of the control surfaces, switching of the control laws can be appropriately performed.

Furthermore, a method for controlling an aircraft according to the present invention is a method for controlling an aircraft including a control unit that controls flight based on either a first control law or a second control law, the first control law controlling flight by controlling deflection angles of control surfaces and the second control law controlling flight by controlling the deflection angles of the control surfaces and engine thrust, and a control surface failure/damage detection unit that detects that at least one of the control surfaces is malfunctioning, the method including a first step of calculating the deflection angles and rates of change of the deflection angles that are necessary for realization of desired flight characteristics based on a detection result of the control surface failure/damage detection unit if malfunctioning of the control surface(s) is detected by the control surface failure/damage detection unit, and a second step of judging whether or not switching from the first control law to the second control law is necessary by judging whether or not the deflection angles or the rates of change of the deflection angles that are calculated in the first step exceed an acceptable range of change.

According to the present invention, since the necessity of switching from the first control law to the second control law is judged from the deflection angles and the rates of change of the deflection angles of the control surfaces, switching of the control laws can be appropriately performed.

Advantageous Effects of Invention

According to the present invention, a superior capability of appropriately performing switching from a control law that controls flight by controlling the deflection angles of control surfaces to a control law that controls flight by controlling the deflection angles of the control surfaces and engine thrust is obtained.

DESCRIPTION OF EMBODIMENTS

Hereinafter, an aircraft control system according to an embodiment of the present invention will be described with reference to the drawings.

Figure 1:
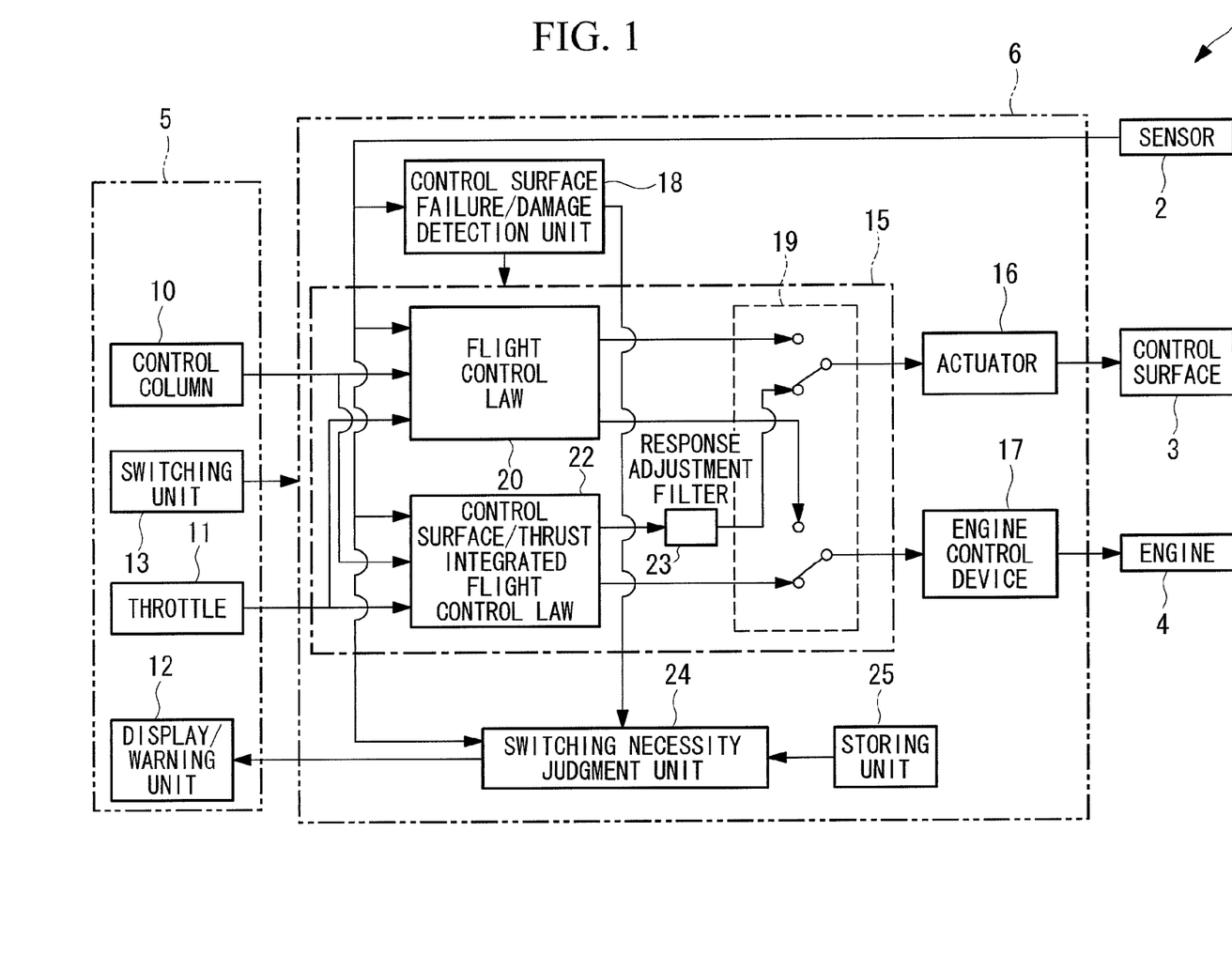
FIG. 1 is a block diagram schematically showing the configuration of an aircraft control system according to an embodiment of the present invention.

FIG. 1 is a block diagram schematically showing the configuration of an aircraft 1 to which the aircraft control system according to the present embodiment is applied. The aircraft 1 includes a sensor 2, control surfaces 3, an engine 4, a cockpit 5, and a control system 6.

The sensor 2 includes various sensors such as an inertial sensor and an air data sensor, and acquires various types of state information regarding the state of an airframe, such as the angular velocity, the attitude angle, the acceleration, the angle of attack, the angle of sideslip, the pressure altitude, and the airspeed of the airframe, and outputs the acquired state information to the control system 6.

The control surfaces 3 include an elevator that moves the nose of the aircraft up or down, a rudder that changes the direction that the nose of the aircraft is pointing to left or right, an aileron that banks the airframe left or right, and a high-lift device (flap) that modifies the airfoil of a main wing to increase lift. An actuator, which will be described later, moves the control surfaces 3, and thus, the attitude of the airframe is controlled by means of an aerodynamic force.

The engine 4, which may be a jet engine, is driven by an engine control device, which will be described later, to produce thrust as a reaction to a high-speed discharge of gases generated by burning fuel with air drawn therein.

In the cockpit 5, instruments (not shown) that indicate the flight conditions of the aircraft 1 are disposed, and as shown in FIG. 1, various types of equipment for enabling a pilot to control the aircraft 1, including a control column 10, a throttle 11, a display/warning unit 12, and a switching unit 13, are disposed.

The pilot operates the control column 10 to control the control surfaces 3, and an operation command signal for controlling the control surfaces that is generated by the pilot operating the control column 10 is output to the control system 6. It should be noted that in the aircraft 1 according to the present embodiment, when control is performed based on a control surface/thrust integrated flight control law 22, which will be described later, not only the control surfaces 3 but also engine thrust is controlled via the control column 10.

The pilot operates the throttle 11 to control engine thrust, and an operation command signal for controlling engine thrust that is generated by the pilot operating the throttle 11 is output to the control system 6.

The display/warning unit 12 issues a predetermined warning to the pilot based on information from the control system 6 by turning on a predetermined warning light, making a warning sound (a voice, a buzzing sound, or the like), or performing a display on a display unit (not shown) provided inside the cockpit 5. In the present embodiment, especially when there is a malfunction of any control surface 3 due to damage to that control surface, and the need to switch from the flight control law 20 to the control surface/thrust integrated flight control law 22 arises (details will be described later), the display/warning unit 12 informs the pilot to that effect.

The switching unit 13 outputs a switching command signal for switching the flight control law 20 and the control surface/thrust integrated flight control law 22 of the control system 6, and the switching command signal is output to the control system 6 based on an operation by the pilot.

The control system 6 includes a computer 15 for computing a predetermined control signal, an actuator 16 that moves the control surfaces 3 based on the control signal output from the computer 15, an engine control device 17 that drives the engine 4 also based on the control signal output from the computer 15, and a control surface failure/damage detection device 18 that detects an operating state of the control surfaces.

The computer 15 computes a deflection angle command control signal and a thrust command control signal, and includes the flight control law 20, the control surface/thrust integrated flight control law 22, a switch processing unit 19 for switching between these two laws, and a switching necessity judgment unit 24 that judges the necessity of switching.

The flight control law 20 is a control law for enabling the aircraft 1 to be flown automatically or manually by the pilot in a state in which the aircraft 1 is flying normally with its equipment such as the control surfaces 3 functioning normally, and controls flight by controlling the deflection angles of the control surfaces 3.

In a state in which the aircraft 1 is controlled based on the flight control law 20, to control especially the attitude of the aircraft 1, the computer 15 generates a deflection angle command control signal based on the operation command signal from the pilot via the control column 10 and the state information from the sensor 2. Every generated deflection angle command control signal is output to the actuator 16, and the actuator 16 moves the control surfaces 3 in accordance with the deflection angle command control signal to control the deflection angles, thereby changing or maintaining the attitude of the aircraft 1.

It should be noted that based on the result of detection by the control surface failure/damage detection device 18, the flight control law 20 according to the present embodiment is capable of signal reconfiguration so as to distribute a control drive signal to the control surfaces 3 that are functioning normally, in order not to use a failed control surface 3 or in order to decrease the extent to which a failed control surface 3 is used.

The control surface/thrust integrated flight control law 22 is a control law for enabling the aircraft 1 to be flown automatically or manually by the pilot when any of the control surfaces 3 of the aircraft 1 malfunctions, and controls flight by controlling the deflection angles of the control surfaces 3 and the engine thrust.

In a state in which the aircraft 1 is controlled based on the control surface/thrust integrated flight control law 22, to control the attitude of the aircraft 1, the computer 15 generates a deflection angle command control signal and a thrust command control signal based on the operation command signal from the pilot via the control column 10 and the state information from the sensor 2. According to the control surface/thrust integrated flight control law 22, since the thrust command control signal is computed based on the operation command signal and the state information, even when the throttle 11 is operated, the computer 15 restricts the effect of this operation and automatically puts high priority on computation of the thrust command control signal based on the operation command signal and the state information.

The generated deflection angle command control signal is output to the actuator 16, and the actuator 16 moves the control surfaces 3 in accordance with the deflection angle command control signal. The generated thrust command control signal is output to the engine control device 17, and the engine control device 17 drives the engine 4 in accordance with the thrust command control signal. As a result of the control surfaces 3 being moved in accordance with the deflection angle command control signal and the engine 4 being driven in accordance with the thrust command control signal, the deflection angles and the engine thrust are controlled, and the attitude of the aircraft 1 is changed or maintained accordingly.

It should be noted that a response adjustment filter 23 for adjusting the difference in response speed between the engine 4 and the control surfaces 3 is provided on a path over which the deflection angle command control signal is output from the control surface/thrust integrated flight control law 22 to the actuator 16. The response adjustment filter 23 can perform response speed adjustment by, for example, filtering the deflection angle command control signal.

Generally, the response speed from when a thrust command control signal is output to control engine thrust until when the engine 4 outputs engine thrust based on that thrust command control signal is slower than the response speed from when a deflection angle command control signal is output to control the deflection angles until when the control surfaces 3 reach the respective deflection angles based on that deflection angle command control signal. Moreover, the response speed of the airframe varies depending on which portion of the control surfaces 3 malfunctions. For this reason, the response adjustment filter 23 is provided to perform adjustment so as to make the response speed of the control surfaces 3 almost equal to the response speed of the engine 4, thereby achieving a uniform response speed of the airframe regardless of which portion of the control surfaces 3 malfunctions.

The control surface failure/damage detection device 18 judges whether the control surfaces 3 function normally based on the state information regarding the aircraft 1 output from the sensor 2, detects a malfunction if any or all of the control surfaces 3 are inoperative or broken, and outputs a malfunction signal to that effect and aerodynamic coefficients to the switching necessity judgment unit 24.

The following is a description of calculation of an aerodynamic coefficient by the control surface failure/damage detection device 18. The control surface failure/damage detection device 18 includes a candidate value calculation unit and an aerodynamic coefficient estimate determination unit.

The candidate value calculation unit provided in the control surface failure/damage detection device 18 includes at least any two of a computing device that stores an algorithm based on the extended Kalman filter, a computing device that stores an algorithm based on the unscented Kalman filter, a computing device that stores an algorithm based on the Fourier transform regression technique, and a computing device that stores an algorithm based on the neural network technique, and the computing devices are adapted to individually calculate a candidate value for estimating the aerodynamic coefficients from the sensor information, which will be described later, based on the respective stored algorithms. Here, candidate value calculation by the computing devices is not limited to calculation based on the algorithms related to the above-described four estimation techniques, and for example, algorithms related to other estimation techniques such as a particle filter can also be applied.

It should be noted that specific operation expressions and the like based on the techniques for calculating candidate values by the above-described computing devices have already been made public by the inventor of the present invention at, for example, a symposium held by the Japan Society for Aeronautical and Space Sciences (reference number: JSASS-2009-5057) and are known, and therefore, a further description thereof is not given here.

The aerodynamic coefficient estimate determination unit determines an aerodynamic coefficient estimate from a plurality of candidate values calculated in the candidate value calculation unit. Specifically, an average or a median of the candidate values is computed, and the computed average or median is finally determined as an aerodynamic coefficient estimate. Beside this, it also is possible to compute reproduced values of the sensor information corresponding to the candidate values, respectively, using the candidate values and compare the reproduced values with the sensor information, thereby determining a candidate value corresponding to a reproduced value that matches or is the closest to the sensor information as the aerodynamic coefficient estimate.

More specifically, when calculating aerodynamic coefficients, the control surface failure/damage detection device 18 first generates a deflection angle command signal that moves the control surfaces 3 so as to impart a certain degree of motion to the airframe in order to estimate aerodynamic coefficients, and outputs the generated deflection angle command signal to the computer 15. The computer 15 generates a deflection angle command signal for changing or maintaining the airframe to or at a desired attitude, superimposes the deflection angle command signal that has been generated by the control surface failure/damage detection device 18 on this deflection angle command signal, and outputs the resultant superimposed deflection angle command signal to the actuator 16, and the actuator 16 moves the control surfaces 3 in accordance with the deflection angle command signal.

As a result of the control surfaces 3 being moved, the airframe makes a motion such as swaying in accordance with the deflection angle command signal, and accordingly, kinetic state quantities of the airframe that are continuously or periodically acquired by the sensor 2 change. The sensor 2 detects the resulting kinetic state quantities as the sensor information and outputs the sensor information to the control surface failure/damage detection device 18.

Next, the computing devices of the candidate value calculation unit individually compute candidate values based on the sensor information detected by the sensor 2, and the candidate value calculation unit outputs the computation results to the aerodynamic coefficient estimate determination unit. Then, the aerodynamic coefficient estimate determination unit determines the final aerodynamic coefficient estimates based on the candidate values received from the candidate value calculation unit, and outputs the determined aerodynamic coefficient estimates to the switching necessity judgment unit 24.

The switch processing unit 19 switches between the flight control law 20 and the control surface/thrust integrated flight control law 22 as appropriate in response to the switching command signal from the switching unit 13 based on an instruction from the pilot depending on the state of the aircraft 1.

Based on the detection result of the control surface failure/damage detection device 18, the switching necessity judgment unit 24 executes switching necessity judgment processing for judging whether or not switching from the flight control law 20 to the control surface/thrust integrated flight control law 22 is necessary.

It should be noted that the storing unit 25 is a semiconductor storage or a magnetic storage, and stores various types of data (an aerodynamic database regarding the aircraft 1, a database of specifications of the airframe of the aircraft 1, and the like) that are necessary for the switching necessity judgment processing.

Hereinafter, effects of the thus configured aircraft control system will be described.

When there is no abnormality in the equipment such as the control surfaces 3 of the aircraft 1 according to the present embodiment, the aircraft 1 flies under control based on the flight control law 20. During the flight, if the control surface failure/damage detection device 18 detects that at least one of the control surfaces 3 malfunctions for some reason such as damage, the switching necessity judgment unit 24 executes the switching necessity judgment processing.

Figure 2:
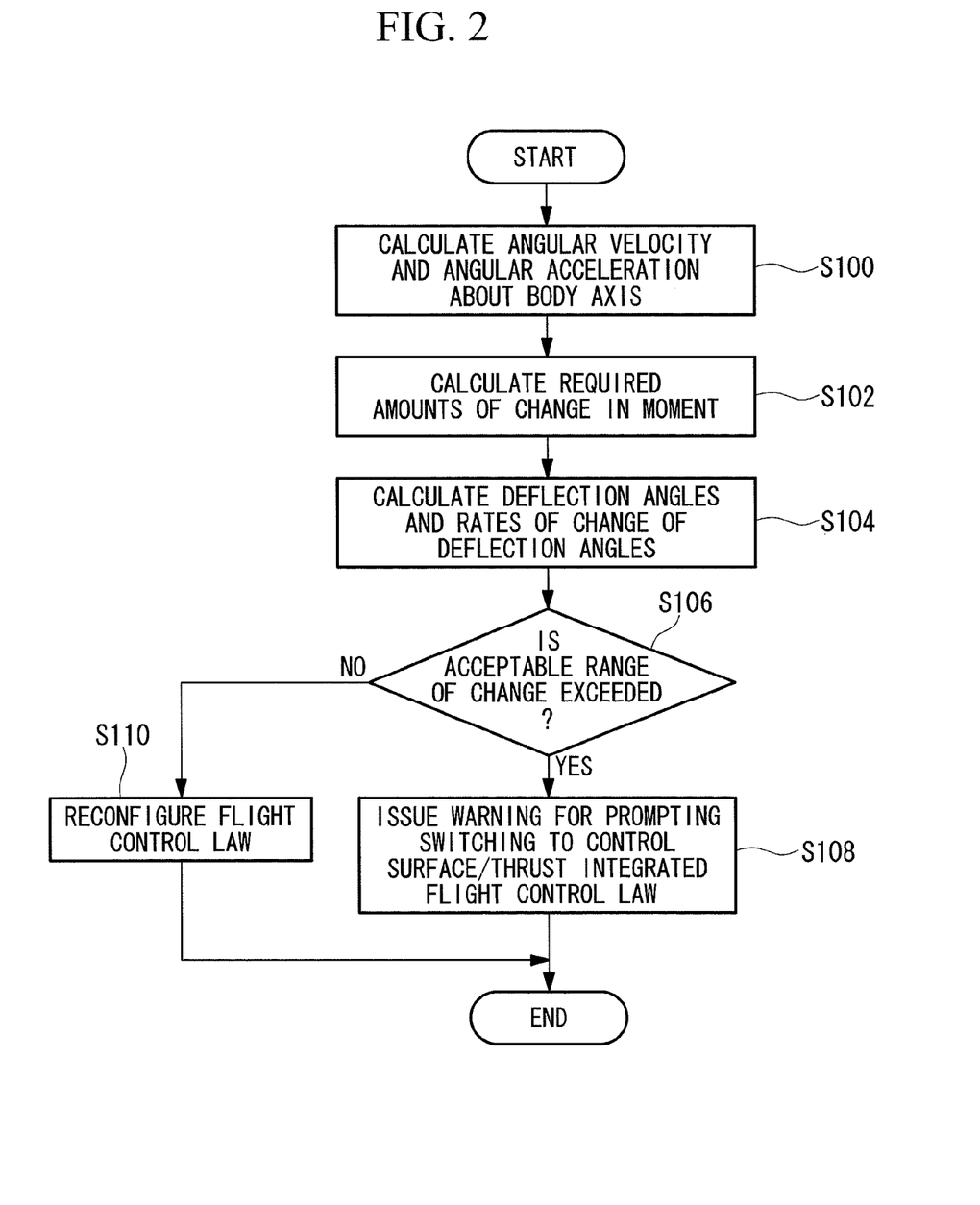
FIG. 2 is a flowchart illustrating the flow of processing of a program for judging the necessity of switching according to an embodiment of the present invention.

FIG. 2 is a flowchart illustrating the flow of processing of a program for judging the necessity of switching, the program being executed by the switching necessity judgment unit 24 during execution of the switching necessity judgment processing. The program for judging the necessity of switching is stored in the storing unit 25.

It should be noted that in the following description, processing steps with respect to a roll mode of the aircraft 1 will be described as an example. Table 1 shows explanations of symbols in formulae below.

TABLE 1

| | |
|---|---|
| p: roll rate (body axis) | $\delta_i$: deflection angle of i-th control surface |
| q: pitch rate (body axis) | $\alpha_t$: trim angle of attack |
| r: yaw rate (body axis) | v: trim speed |
| p*: roll rate (stable axis) | ρ: air density in trimmed flight conditions |
| r*: yaw rate (stable axis) | $\tau_R$: roll-mode time constant |
| $P_c$: roll rate command (stable axis) | $C_y$: dimensionless aerodynamic coefficient (lateral translational motion) |
| $\phi_w$: roll angle (wind axis) | $L_\beta$: dimensional aerodynamic coefficient (dihedral effect) |
| $\theta_w$: pitch angle (wind axis) | $L_p$: dimensional aerodynamic coefficient (roll damping) |
| L: moment due to external force (roll) (body axis) | $L_r$: dimensional aerodynamic coefficient (roll due to yaw rate) |
| M: moment due to external force (pitch) (body axis) | $L_{\delta i}$: dimensional aerodynamic coefficient (roll control effectiveness) |
| N: moment due to external force (yaw) (body axis) | $M_u$: dimensional aerodynamic coefficient (pitch due to velocity) |
| $N_y$: lateral load factor (body axis) | $M_\alpha$: dimensional aerodynamic coefficient (longitudinal static stability) |
| u: change in velocity (X body axis component) | $M_q$: dimensional aerodynamic coefficient (pitch damping) |
| α: change in angle of attack (= Δα) | $M_{\delta i}$: dimensional aerodynamic coefficient (pitch control effectiveness) |
| β: change in angle of sideslip | $N_\beta$: dimensional aerodynamic coefficient (directional stability) |
| W: airframe weight | $N_p$: dimensional aerodynamic coefficient (yaw due to roll rate) |
| S: surface area | $N_r$: dimensional aerodynamic coefficient (yaw damping) |

TABLE 1-continued

| | |
|---|---|
| $I_{xx}$: moment of inertia (X body axis) | $N_{\delta i}$: dimensional aerodynamic coefficient (yaw control effectiveness) |
| $I_{yy}$: moment of inertia (Y body axis) | n: number of control surfaces |
| $I_{zz}$: moment of inertia (Z body axis) | g: acceleration of gravity |
| $I_{zx}$: product of inertia | s: Laplace operator |

It should be noted that the trim angle of attack $\alpha_t$, the trim speed v, the air density ρ in trimmed flight conditions, and the like are obtained from the sensor 2 or a database of the results of previously performed trim calculation, the database being stored in the storing unit 25.

Moreover, the airframe weight W, the surface area S, the moments of inertia $I_{XX}$, $I_{YY}$, $I_{ZZ}$, the product of inertia $I_{ZX}$, and the like are stored in the storing unit 25 as the database of specifications of the airframe of the aircraft 1. Furthermore, the aerodynamic coefficients are stored in the storing unit 25 as the aerodynamic database.

In step 100, the angular velocity and the angular acceleration about a body axis of the aircraft 1 are calculated based on a response model that indicates motion characteristics (mode) of the aircraft 1.

An ideal rolling motion (roll rate p*) about a stable axis of the aircraft 1 and a yawing motion (yaw rate r*) concomitant with this rolling motion are respectively expressed by a transfer function represented by Formula (1) and relations represented by Formula (2).

{Formula 1}

$$p^* = \frac{1}{\tau_R \cdot s + 1} P_c \quad (1)$$

{Formula 2}

$$r^* = \frac{N_y \cdot g}{v} + g \frac{\cos\theta_w \cdot \sin\phi_w}{v} \quad (2)$$

$$N_y = \frac{\rho \cdot v^2 \cdot S \cdot C_y}{2W}$$

It should be noted that approximations of $\cos\theta_w = 1$ and $\phi_w = p^*/s$ (p* divided by "s") may also be used in Formula (2).

Accordingly, the angular velocity about the body axis is represented by Formula (3), and the angular acceleration about the body axis is represented by Formula (4). The angular velocity and the angular acceleration about the body axis are calculated by substituting, for example, a minimum necessary flight characteristic value (roll-mode time constant $\tau_R$ in the case of the roll mode) and Formula (2) into Formulae (3) and (4). It should be noted that minimum necessary flight characteristic values are stored in the storing unit 25.

{Formula 3}

$$p = p^* \cdot \cos\alpha_t - r^* \cdot \sin\alpha_t = \frac{\cos\alpha_t}{\tau_R \cdot s + 1} P_c - r^* \cdot \sin\alpha_t$$

$$r = p^* \cdot \sin\alpha_t + r^* \cdot \cos\alpha_t = \frac{\sin\alpha_t}{\tau_R \cdot s + 1} P_c + r^* \cdot \cos\alpha_t \tag{3}$$

$$q = 0$$

{Formula 4}

$$\dot{p} = p \cdot s = \frac{\cos\alpha_t \cdot s}{\tau_R \cdot s + 1} P_c - r^* \cdot \sin\alpha_t \cdot s$$

$$\dot{s} = r \cdot s = \frac{\sin\alpha_t \cdot s}{\tau_R \cdot s + 1} P_c + r^* \cdot \cos\alpha_t \cdot s \tag{4}$$

$$\dot{q} = 0$$

Note that $\dot{q}=0$ because no pitching motion is generated during an ideal rolling motion.

In the next step 102, required amounts of change in moment are calculated based on nonlinear equations of motion with respect to rotation of the aircraft 1.

The nonlinear equations of motion with respect to rotation of the aircraft 1 are expressed by Formula (5), where L, M, and N are external forces.

{Formula 5}

$$L = I_{XX}\dot{p} - I_{ZX}\cdot(\dot{r}+p\cdot q) - (I_{YY}-I_{ZZ})\cdot q\cdot r$$

$$M = I_{YY}\dot{q} - I_{ZX}\cdot(r^2-p^2) - (I_{ZZ}-I_{XX})\cdot r\cdot p$$

$$N = I_{ZZ}\dot{r} - I_{ZX}\cdot(\dot{p}+q\cdot r) - (I_{XX}-I_{YY})\cdot p\cdot q \tag{5}$$

Note that since $q=0$ and $\dot{q}=0$, Formula (5) can be expressed as Formula (6).

{Formula 6}

$$L = I_{XX}\dot{p} - I_{ZX}\dot{r}$$

$$M = -I_{ZX}\cdot(r^2-p^2) - (I_{ZZ}-I_{XX})\cdot r\cdot p$$

$$N = I_{ZZ}\dot{r} - I_{ZX}\dot{p} \tag{6}$$

Moreover, the external forces L, M, and N can be expressed by Formula (7) using dimensional aerodynamic coefficients.

{Formula 7}

$$L = L_\beta \cdot \beta + L_p \cdot p + L_r \cdot r + \sum_{i=1}^{n} L_{\delta i} \cdot \delta_i$$

$$M = M_u \cdot u + M_\alpha \cdot \alpha + M_q \cdot q + \sum_{i=1}^{n} M_{\delta i} \cdot \delta_i \tag{7}$$

$$N = N_\beta \cdot \beta + N_p \cdot p + N_r \cdot r + \sum_{i=1}^{n} N_{\delta i} \cdot \delta_i$$

It should be noted that Formula (7) can be expressed as Formula (8) because $u=\alpha=q=\beta=0$ in an ideal rolling motion.

{Formula 8}

$$L = L_p \cdot p + L_r \cdot r + \sum_{i=1}^{n} L_{\delta i} \cdot \delta_i$$

$$M = \sum_{i=1}^{n} M_{\delta i} \cdot \delta_i \tag{8}$$

$$N = N_p \cdot p + N_r \cdot r + \sum_{i=1}^{n} N_{\delta i} \cdot \delta_i$$

Now, the required amounts of change in moment that are expressed by Formula (9) are obtained from Formulae (6) and (8).

{Formula 9}

$$\sum_{i=1}^{n} L_{\delta i} \cdot \delta_i = I_{XX} \cdot \dot{p} - I_{ZX} \cdot \dot{r} - L_p \cdot p - L_r \cdot r$$

$$\sum_{i=1}^{n} M_{\delta i} \cdot \delta_i = -I_{ZX} \cdot (r^2 - p^2) - (I_{ZZ} - I_{XX}) \cdot r \cdot p \tag{9}$$

$$\sum_{i=1}^{n} N_{\delta i} \cdot \delta_i = I_{ZZ} \cdot \dot{r} - I_{ZX} \cdot \dot{p} - N_p \cdot p - N_r \cdot r$$

In the next step 104, deflection angles and the rates of change of the deflection angles are calculated.

First, Formula (9) is expressed using matrices, and thus Formula (10) is obtained.

{Formula 10}

$$\begin{pmatrix} L_{\delta 1} & L_{\delta 2} & \cdots & L_{\delta n} \\ M_{\delta 1} & M_{\delta 2} & \cdots & M_{\delta n} \\ N_{\delta 1} & N_{\delta 2} & \cdots & N_{\delta n} \end{pmatrix} \begin{pmatrix} \delta_1 \\ \delta_2 \\ \vdots \\ \delta_n \end{pmatrix} = \begin{pmatrix} I_{XX} \cdot \dot{p} - I_{ZX} \cdot \dot{r} - L_p \cdot p - L_r \cdot r \\ -I_{ZX} \cdot (r^2 - p^2) - (I_{ZZ} - I_{XX}) \cdot r \cdot p \\ I_{ZZ} \cdot \dot{r} - I_{ZX} \cdot \dot{p} - N_p \cdot p - N_r \cdot r \end{pmatrix} \tag{10}$$

Here, as represented by Formula (11), the matrix contained in the left side of Formula (10) is defined as a control effectiveness matrix B, and the right side of Formula (10) is denoted by F, and thus Formula (12) for calculating deflection angles is obtained.

{Formula 11}

$$B = \begin{pmatrix} L_{\delta 1} & L_{\delta 2} & \cdots & L_{\delta n} \\ M_{\delta 1} & M_{\delta 2} & \cdots & M_{\delta n} \\ N_{\delta 1} & N_{\delta 2} & \cdots & N_{\delta n} \end{pmatrix} \tag{11}$$

$$F = \begin{pmatrix} I_{XX} \cdot \dot{p} - I_{ZX} \cdot \dot{r} - L_p \cdot p - L_r \cdot r \\ -I_{ZX} \cdot (r^2 - p^2) - (I_{ZZ} - I_{XX}) \cdot r \cdot p \\ I_{ZZ} \cdot \dot{r} - I_{ZX} \cdot \dot{p} - N_p \cdot p - N_r \cdot r \end{pmatrix}$$

{Formula 12}

$$\begin{pmatrix} \delta_1 \\ \delta_2 \\ \vdots \\ \delta_n \end{pmatrix} = B^T (B \cdot B^T)^{-1} \cdot F \tag{12}$$

It should be noted that $B^T(B \cdot B^T)^{-1}$ on the left side of Formula (12) represents an optimum deflection angle distribution law.

Then, in step 104, the time histories of the angular velocity calculated by Formula (3) and the angular acceleration calculated by Formula (4) are substituted into Formula (12), and thus the response time history of each deflection angle is calculated.

Furthermore, in step 104, the rate of change of each deflection angle is calculated by numerically differentiating the calculated response time history of each deflection angle.

It should be noted that the control effectiveness aerodynamic coefficients (roll control effectiveness $L_{\delta i}$, pitch control effectiveness $M_{\delta i}$, yaw control effectiveness $N_{\delta i}$) that are used in Formula (12) are obtained from the detection result of the control surface failure/damage detection device 18, and the dynamic stability aerodynamic coefficients (roll damping $L_p$, roll due to yaw rate $L_r$, directional stability $N_\rho$, yaw damping $N_r$) that are used in Formula (12) are obtained from the aerodynamic database stored in the storing unit 25.

In the next step 106, it is judged whether or not either the deflection angles or the rates of change of the deflection angles, which have been calculated in step 104, exceed an acceptable range of change. If it is judged YES, the processing proceeds to step 108, and if it is judged NO, the processing proceeds to step 110. That is to say, in step 106, it is judged whether or not flight based on minimum necessary flight characteristic values can be realized by control of the deflection angles of the control surfaces 3 (flight control law 20) when there is a malfunction of the control surface(s) 3.

It should be noted that the aforementioned acceptable range of change specifically refers to an operating range and a maximum rate of change of the deflection angles, and is specified by the characteristic values of the actuator 16 for moving the control surfaces 3. The characteristic values of the actuator 16 and the aforementioned acceptable range of change are stored in the storing unit 25 beforehand.

In step 108, the display/warning unit 12 is caused to issue a warning for prompting the pilot to switch from the flight control law 20 to the control surface/thrust integrated flight control law 22, and the program is finished.

When the display/warning unit 12 issues a warning, the pilot of the aircraft 1 recognizes the malfunctioning of the control surface(s) 3. Thus, the pilot operates the switching unit 13 to switch from the flight control law 20 to the control surface/thrust integrated flight control law 22. The switching unit 13 outputs a switching command signal in response to this operation. The computer 15 drives the switch processing unit 19 based on the switching command signal, thereby switching the control law for the aircraft 1 from the flight control law 20 to the control surface/thrust integrated flight control law 22 so that the aircraft 1 is controlled based on the control surface/thrust integrated flight control law 22.

On the other hand, in step 110, the malfunctioning of the control surface(s) 3 is dealt with by reconfiguring the flight control law 20 so as not to use the control surface(s) 3 whose malfunctioning is detected, or so as to decrease the extent to which this(these) control surface(s) is used, and the program is finished.

If the flight control law 20 is reconfigured, the control system 6 controls the aircraft 1 based on the reconfigured flight control law 20.

The control system 6 of the aircraft 1 according to the present embodiment may also take the effect of the gyroscopic moment of the engine 4 into account when calculating the required amounts of change in moment of the aircraft 1. This enables more accurate calculation of the deflection angles and the rates of change of the deflection angles that are necessary for realization of various modes of the aircraft 1.

Specifically, terms A and B that indicate the gyroscopic moment effect of the engine 4 are added to the right side of Formula (5).

{Formula 13}

$$L = I_{XX} \cdot \dot{p} - I_{ZX} \cdot (\dot{r} + p \cdot q) - (I_{YY} - I_{ZZ}) \cdot q \cdot r$$

$$M = I_{YY} \cdot \dot{q} - I_{ZX} \cdot (r^2 - p^2) - (I_{ZZ} - I_{XX}) \cdot r \cdot p + A$$

$$N = I_{ZZ} \cdot \dot{r} - I_{ZX} \cdot (\dot{p} + q \cdot r) - (I_{XX} - I_{YY}) \cdot p \cdot q + B \tag{13}$$

{Formula 14}

$$A = -I_p \cdot \Omega_p \cdot r$$

$$B = I_p \cdot \Omega_p \cdot q \tag{14}$$

Furthermore, if the deflection angle of a control surface 3 is fixed due to a failure of that control surface or if a control surface 3 is damaged, there is a change in the airframe geometry of the aircraft 1. However, it is not possible to previously know the changes in aerodynamic coefficients caused by this change in the airframe geometry. For this reason, the control system 6 of the aircraft 1 according to the present embodiment may also calculate the required amounts of change in moment using the dynamic stability aerodynamic coefficients (roll damping $L_p$, roll due to yaw rate $L_r$, directional stability $N_\rho$, yaw damping $N_r$) that have been detected by the control surface failure/damage detection device 18.

As described above, the control system 6 of the aircraft 1 according to the present embodiment includes the computer 15 that controls flight based on either the flight control law 20, which controls flight by controlling the deflection angles of the control surfaces 3, or the control surface/thrust integrated flight control law 22, which controls flight by controlling the deflection angles of the control surfaces 3 and the engine thrust, and the control surface failure/damage detection device 18 that detects that at least one of the control surfaces 3 is malfunctioning. Moreover, if the control surface failure/damage detection device 18 detects that there is a malfunction of the control surface(s) 3, the control system 6, based on the detection result of the control surface failure/damage detection device 18, calculates the deflection angles and the rates of change of the deflection angles of the control surfaces 3 that are necessary for realization of desired flight characteristics, and judges whether or not the calculated deflection angles or rates of change of the deflection angles exceed an acceptable range of change, thereby judging whether or not switching from the flight control law 20 to the control surface/thrust integrated flight control law 22 is necessary.

Therefore, the control system 6 of the aircraft 1 according to the present embodiment can appropriately perform switching from the flight control law 20 to the control surface/thrust integrated flight control law 22.

Moreover, if the control surface failure/damage detection device 18 detects that there is a malfunction of the control surface(s) 3 and if the calculated deflection angles or rates of change of the deflection angles do not exceed the acceptable range of change, the control system 6 of the aircraft 1 according to the present embodiment reconfigures the flight control law 20 so as not to use the control surface(s) 3 whose malfunctioning has been detected, or so as to decrease the extent to which this(these) control surface(s) is used, and thus switching from the flight control law 20 to the control surface/thrust integrated flight control law 22 can be suppressed. On the other hand, if the calculated deflection angles or rates of change of the deflection angles exceed the acceptable range of change, the airframe control law is switched from the flight control law 20 to the control surface/thrust integrated flight control law 22, and thus switching of the control law is performed only if necessary.

Moreover, the control system 6 of the aircraft 1 according to the present embodiment calculates the required amounts of change in moment of the aircraft 1 from the angular velocity and the angular acceleration about a body axis of the aircraft 1 that are calculated based on a response model indicating the motion characteristics of the aircraft, and calculates the deflection angles and the rates of change of the deflection angles that satisfy the calculated required amounts of change in moment. Therefore, the control system 6 can easily calculate the deflection angles and the rates of change of the deflection angles that are necessary for realization of various aircraft modes such as a roll mode, a Dutch roll mode, and a longitudinal short-period mode.

Modification

In the foregoing embodiment, the switching necessity judgment processing with respect to the roll mode of the aircraft 1 has been described as an example. However, the present invention is not limited to this, and as in a modification below, for example, for other modes such as the Dutch roll mode and the longitudinal short-period mode of the aircraft 1, the deflection angles and the rates of change of the deflection angles of the control surfaces 3 may also be calculated based on a transfer function appropriate for each mode.

Figure 3:
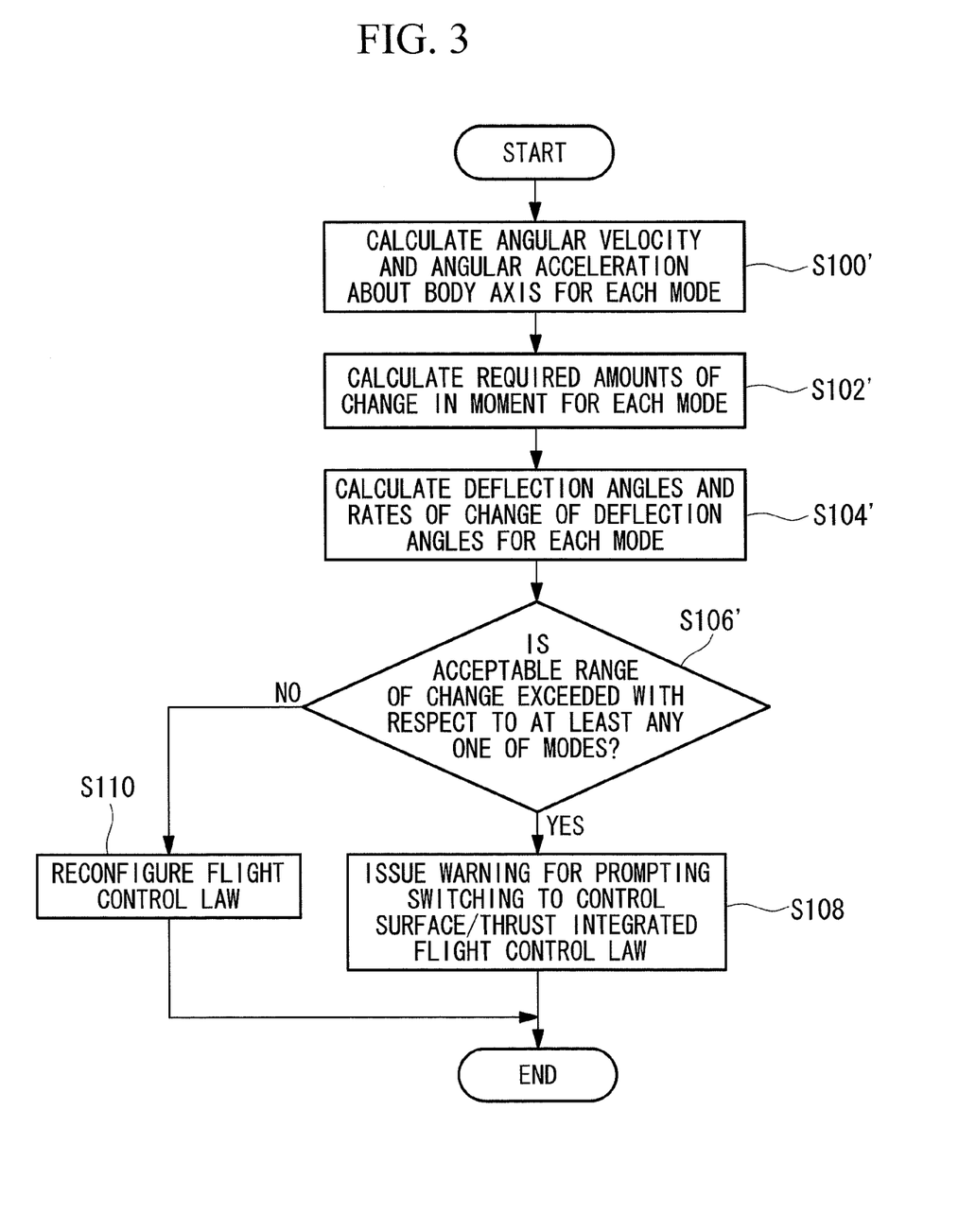
FIG. 3 is a flowchart illustrating the flow of processing of a program for judging the necessity of switching according to a modification.

In this modification, for example, in the case of the Dutch roll mode, the deflection angles and the rates of change of the deflection angles are calculated by calculating the angular velocity and the angular acceleration about a body axis based on a transfer function that indicates an ideal response of the angle of sideslip β in the Dutch roll mode. In the case of the longitudinal short-period mode, the deflection angles and the rates of change of the deflection angles are calculated by calculating the angular velocity and the angular acceleration about a body axis based on a transfer function that indicates ideal responses of the vertical load factor and the angle of attack.

FIG. 3 is a flowchart illustrating the flow of processing of a program for judging the necessity of switching according to this modification. In FIG. 3, those steps that are similar to or the same as the steps of FIG. 2 are denoted by the same reference numerals as in FIG. 2 with or without an apostrophe added at the end, and descriptions of those steps will be partially omitted.

First, in step 100', based on response models that respectively indicate the roll mode, the Dutch roll mode, and the longitudinal short-period mode of the aircraft 1, the angular velocity and the angular acceleration about a body axis of the aircraft 1 with respect to each mode are calculated.

In the next step 102', the required amount of change in moment with respect to each mode is calculated.

In the next step 104', the deflection angles and the rates of change of the deflection angles with respect to each mode are calculated.

In the next step 106', it is judged whether or not the deflection angles or the rates of change of the deflection angles, which have been calculated in step 104', with respect to at least one of the roll mode, the Dutch roll mode, and the longitudinal short-period mode exceed an acceptable range of change, and if it is judged YES, the processing proceeds to the step 108, and if it is judged NO, the processing proceeds to step 110.

In step 108, the display/warning unit 12 is caused to issue a warning for prompting the pilot to switch from the flight control law 20 to the control surface/thrust integrated flight control law 22, and the program is finished.

In step 110, the malfunctioning of the control surface(s) 3 is dealt with by reconfiguring the flight control law 20 so as not to use the control surface(s) 3 whose malfunctioning has been detected, or so as to decrease the extent to which this (these) control surface(s) is used, and the program is finished.

Although the present invention has been described using a particular embodiment, the technical scope of the present invention is not limited to the scope that has been described in this particular embodiment. Various changes or improvements can be made to the above embodiment without departing from the gist of the invention, and all such changes and improvements are intended to be within the technical scope of the present invention.

For example, in the above-described embodiment, if the calculated deflection angles or rates of change of the deflection angles exceed an acceptable range of change, the display/warning unit 12 issues a warning, and the pilot is prompted to switch from the flight control law 20 to the control surface/thrust integrated flight control law 22. However, the present invention is not limited to this. For example, according to the present invention, it is also possible that if the calculated deflection angles or rates of change of the deflection angles exceed an acceptable range of change, the control system 6 automatically switches from the flight control law 20 to the control surface/thrust integrated flight control law 22 without requiring the pilot to operate the switching unit 13.

Moreover, the flows of processing of the programs for judging the necessity of switching that have been described in the above embodiment and modification are merely examples as well, and it is, of course, possible to eliminate an unnecessary step, add a new step, and change the order of processing without departing from the gist of the present invention.

REFERENCE SIGNS LIST

1 Aircraft
2 Sensor
3 Control surface
4 Engine
5 Cockpit
6 Control system
10 Control column
12 Display/warning unit
13 Switching unit
15 Computer
16 Actuator
17 Engine control device
18 Control surface failure/damage detection device
19 Switch
20 Flight control law
22 Control surface/thrust integrated flight control law
23 Response adjustment filter
24 Switching necessity judgment unit
25 Storing unit

The invention claimed is:

1. A aircraft control system comprising:
a control unit that controls flight based on either a first control law or a second control law, the first control law controlling flight by controlling deflection angles of control surfaces and the second controlling law controlling flight by controlling the deflection angles of the control surfaces and engine thrust;
a control surface failure/damage detection unit that detects that at least one of the control surfaces is malfunctioning;
a calculation unit that calculates the deflection angles and rates of change of the deflection angles that are necessary for realization of desired flight characteristics based on a detection result of the control surface failure/damage detection unit if malfunctioning of the control surface(s) is detected by the control surface failure/damage detection unit; and a judgment unit that judges whether or not switching from the first control law to the second control law is necessary by judging whether or not the deflection angles or the rates of change of the deflection angles that are calculated by the calculation unit exceed an acceptable range of change.

2. The aircraft control system according to claim 1, wherein if malfunctioning of the control surface(s) is detected by the control surface failure/damage detection unit, if the deflection angles or the rates of change of the deflection angles that are calculated by the calculation unit do not exceed the acceptable range of change, the control unit reconfigures the first control law so as not to use the control surface(s) whose malfunctioning is detected by the control surface failure/damage detection unit, or so as to decrease the extent to which the control surface(s) is used, and if the deflection angles or the rates of change of the deflection angles that are calculated by the calculation unit exceed the acceptable range of change, the control unit switches from the first control law to the second control law.

3. The aircraft control system according to claim 1, wherein the calculation unit calculates required amounts of change in moment of an aircraft from angular velocity and angular acceleration about a body axis of the aircraft that are calculated based on a response model indicating motion characteristics of the aircraft, and calculates the deflection angles and the rates of change of the deflection angles that satisfy the calculated required amounts of change in moment.

4. The aircraft control system according to claim 3, wherein the calculation unit calculates the required amount of change in moment of the aircraft taking an effect of a gyroscopic moment of an engine into account.

5. An aircraft comprising the aircraft control system according to claim 1.

6. A program for controlling an aircraft including a control unit that controls flight based on either a first control law or a second control law, the first control law controlling flight by controlling deflection angles of control surfaces and the second control law controlling flight by controlling the deflection angles of the control surfaces and engine thrust, and a control surface failure/damage detection unit that detects that at least one of the control surfaces is malfunctioning, the program causing a computer to function as:

a calculation unit that calculates the deflection angles and rates of change of the deflection angles that are necessary for realization of desired flight characteristics based on a detection result of the control surface failure/damage detection unit if malfunctioning of the control surface(s) is detected by the control surface failure/damage detection unit; and a judgment unit that judges whether or not switching from the first control law to the second control law is necessary by judging whether or not the deflection angles or the rates of change of the deflection angles that are calculated by the calculation unit exceed an acceptable range of change.

7. A method for controlling an aircraft including a control unit that controls flight based on either a first control law or a second control law, the first control law controlling flight by controlling deflection angles of control surfaces and the second control law controlling flight by controlling the deflection angles of the control surfaces and engine thrust, and a control surface failure/damage detection unit that detects that at least one of the control surfaces is malfunctioning, the method comprising:

a first step of calculating the deflection angles and rates of change of the deflection angles that are necessary for realization of desired flight characteristics based on a detection result of the control surface failure/damage detection unit if malfunctioning of the control surface(s) is detected by the control surface failure/damage detection unit; and a second step of judging whether or not switching from the first control law to the second control law is necessary by judging whether or not the deflection angles or the rates of change of the deflection angles that are calculated in the first step exceed an acceptable range of change.

8. The aircraft control system according to claim 2, wherein the calculation unit calculates required amounts of change in moment of an aircraft from angular velocity and angular acceleration about a body axis of the aircraft that are calculated based on a response model indicating motion characteristics of the aircraft, and calculates the deflection angles and the rates of change of the deflection angles that satisfy the calculated required amounts of change in moment.

* * * * *